Aug. 2, 1955     E. JUNKER     2,714,325
COPYING TURNER'S LATHE

Filed Oct. 3, 1951     3 Sheets-Sheet 1

Inventor
Emile Junker
By
Singer Stern & Carlberg
attys.

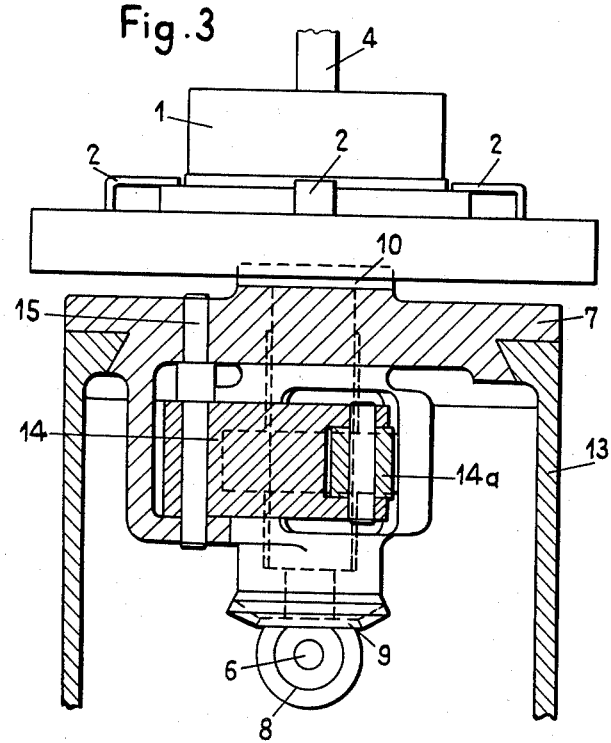

Aug. 2, 1955  E. JUNKER  2,714,325
COPYING TURNER'S LATHE
Filed Oct. 3, 1951  3 Sheets-Sheet 3

Inventor
Emile Junker
By
Singer Stern & Carlberg
Attys

United States Patent Office 2,714,325
Patented Aug. 2, 1955

2,714,325

COPYING TURNER'S LATHE

Emile Junker, Zurich, Switzerland

Application October 3, 1951, Serial No. 249,487

1 Claim. (Cl. 82—18)

The invention relates to a copying turner's lathe and to the copying mechanism thereof for the turning of work pieces to a predetermined shape, particularly of piston rings.

It is a main object of the invention to provide a copying turner's lathe and copying mechanism thereof which allow the machining of piston rings to the high requirements of accuracy which have to be made on them.

It is another object of the invention to provide a copying turner's lathe and copying mechanism thereof, which allow the machining of comparatively large size piston rings simultaneously inside and outside.

It is a further object of the invention to provide a copying turner's lathe and copying mechanism thereof, which allow the machining of piston rings to accurate radial thicknesses.

It is yet another object of the invention to provide a copying turner's lathe and copying mechanism thereof which allow to vary the ratio at which the shape of the copying cam is copied on to the work piece.

According to a main feature of the invention, the copying mechanism comprises in combination: a first transverse carriage slidably arranged on the machine bed, of the lathe, a lathe spindle rotatably journalled in the said carriage about an axis perpendicular to the direction in which the same is slidable, a copying cam fixed to the said spindle, and a rocker arm pivoted on the said slide about an axis parallel to the axis of the said spindle, positively transmitting the throw of the said cam on to the said carriage and thereby reciprocating the same transversely to the machine bed of the lathe.

Preferably the said rocker arm has an abutment face whose geometrical plane passes through the geometrical axis about which the said rocker arm is pivoted on the said carriage.

Another feature of the copying mechanism according to the invention is an abutment adjustable in a guide slot of the machine bed of the lathe perpendicular both to the axis of the said lathe spindle and to the direction in which the said transverse carriage is slidable, the said abutment face of the rocker arm abutting against said abutment.

According to a main feature of the copying turner's lathe according to the invention the same comprises in combination: a machine bed, a first transverse carriage slidably arranged on the said bed, a lathe spindle journalled in the said carriage, a copying cam fixed intermediately to the said lathe spindle, a face plate fixed to one end of the said lathe spindle, a first bevel gear fixed to the other end of the said lathe spindle, a splined drive shaft journalled in the said machine bed and extending in the direction in which the said carriage is slidable, a second bevel gear in permanent mesh with the said first bevel gear journalled in the said carriage and slidably arranged on the said splined shaft, a rocker arm pivoted in the said first carriage about an axis parallel to the axis of the said lathe spindle and having an abutment face whose geometrical plane passes through its pivot axis, a follower roller journalled on the said rocker arm about an axis parallel to the pivot axis thereof, a second transverse carriage adjustable in the said machine bed in a direction perpendicular to the direction in which the said first transverse carriage is slidable, an abutment arranged on the said second transverse carriage, and a spring abutting against the said machine bed and against the said first transverse slide, and biassing the latter with its copying cam against the said follower roller, and thereby biassing the said rocker arm with its abutment face against the said abutment of the said second transverse carriage.

Preferably the said copying turner's lathe comprises in addition: a longitudinal carriage, clamping means on the said face plate clamping and centering in operation a tubular work piece on the said face plate, and turning tools attached to the said longitudinal carriage machining simultaneously the interior and exterior circumference of the work piece.

Further objects and features of the invention may appear from the detailed description of an embodiment thereof given by way of example with reference to the accompanying drawings, and while this embodiment may be considered as typical for the invention and as very suitable, I wish it to be understood that I do not limit myself to the particular details and dimensions disclosed, for obvious modifications will occur to a person skilled in the art in accordance with the conditions and circumstances in which my invention is applied.

In the drawings:

Fig. 3 shows a side elevation along the line 3—3 of Fig. 2.

Figure 1:
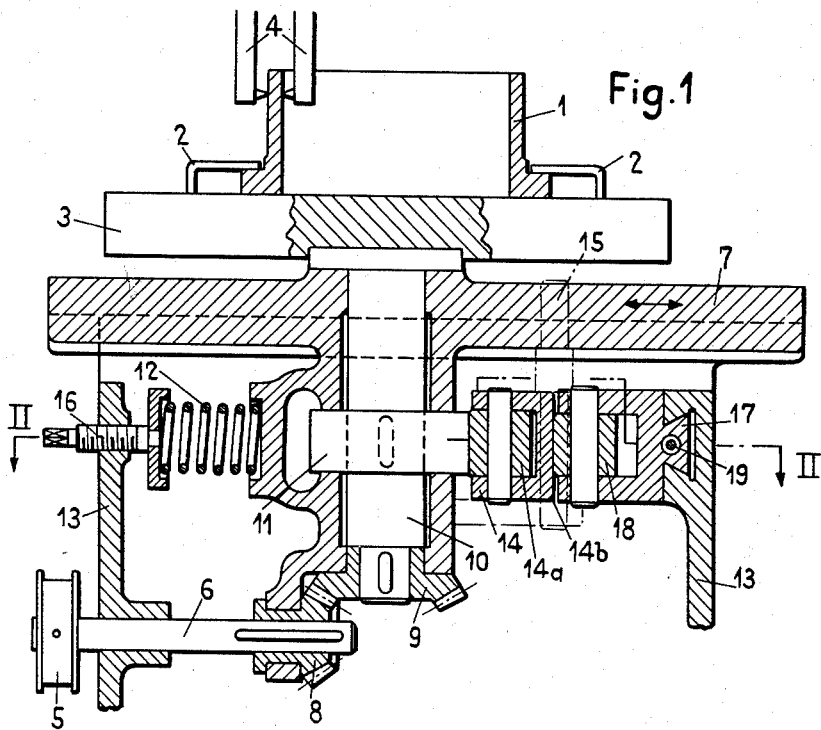
Fig. 1 shows a section through the copying turner's lathe along the centre of the first transverse carriage.
Figure 2:
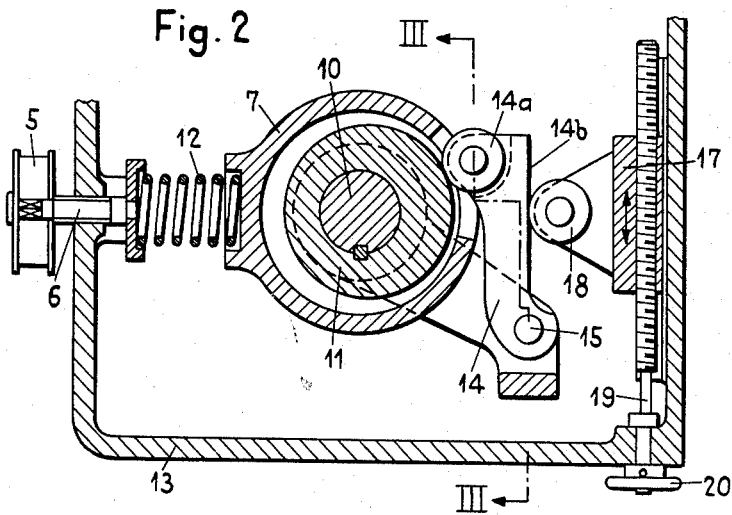
Fig. 2 shows a plan view along the line 2—2 of Fig. 1.
Figure 5:
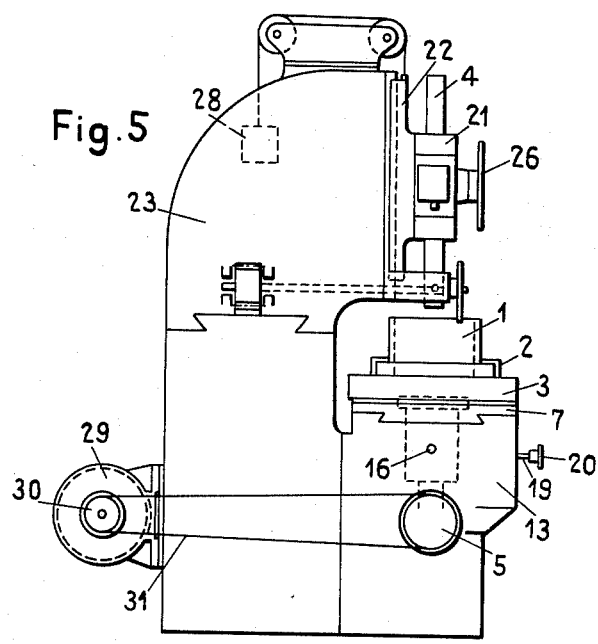
Fig. 5 is a lateral elevation thereof as seen in the direction of the arrow A in Fig. 4.
Figure 4:
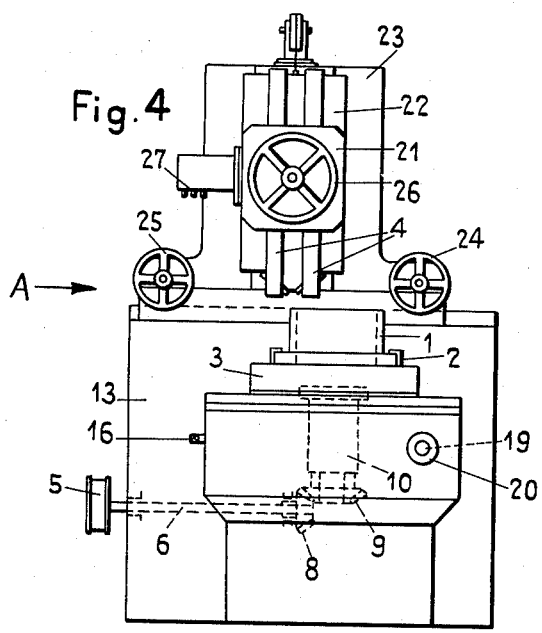
Fig. 4 is a front elevation of the copying turner's lathe according to the invention.

In this embodiment the piston ring pot 1, cast to a shape approximating that of the piston rings to be machined, is clamped on to the face plate 3 by means of clamping irons 2; the stationary turning tools 4, which are mounted on a capstan head 21 journalled in a vertical slide 22, which in turn is mounted on a transverse carriage 23, being capable of being adjusted in accordance with the height of the piston ring pot 1 to be machined, by means of a hand wheel 24. The distance of the said tools 4 from the axis of rotation of the said face plate 3 can be adjusted by means of a hand wheel 25 in accordance with the diameter of the work piece.

Since the piston ring pot 1 is clamped on to the face plate 3 without a mandrel, the inner and outer circumferences thereof can be machined simultaneously so that accurate and uniform wall thicknesses can be attained.

The capstan head 21 can be released from its fixture, and turned 90° by means of the hand wheel 26, and by means of a rake of cutting off tools 27 the individual piston rings can be cut off from the piston ring pot 1 by moving the carriage 23 by means of the hand wheel 25. The vertical slide 22 is balanced by the counterpoise 28. The face plate 3 is driven from the electric motor 29 through the belt pulley 30, belt 31, belt pulley 5, the keyed shaft 6 connected therewith and the bevel gearing formed by the two bevel pinions 8 and 9 which are both journalled in a first transverse carriage 7 of the copying mechanism. The pinion 9 is keyed on to the lathe spindle 10 which is in turn fixedly connected to the face plate 3. The spindle 10 is journaled in the said first transverse carriage 7. The cam 11, the shape of which is to be copied on to the piston ring pot 1, is keyed on to the spindle 10. The said first transverse carriage 7, and together with it the copying cam 11, are always pressed against the roller 14a of a rocker arm 14, on which said roller is journalled, by means of a spring 12 abutting against the machine casing 13. The arm 14 is in turn pivoted without clearance on the said first transverse carriage 7 by means of a pin 15.

By means of the spindle 16 screwed into the machine casing 13 the force of the spring 12 can be varied. By the spring 12, the rocker arm 14 is pressed with its face 14b, which lies in a plane passing through the geometrical axis of the pin 15, against a second transverse carriage 17 which is movable in a slot guide of the machine casing 13 and which carries in turn the abutment roller 18. This second transverse carriage 17 can be shifted relative to the rocker arm 14 by means of the spindle 19 and hand wheel 20 keyed to it, whereby the path of first transverse carriage 7 can be adjusted at will. Since the roller 14a and the roller 18 as well as the rocker arm 14 are journalled without clearance, and the first transverse carriage 7 is always pressed by the spring 12 against the second transverse carriage which is also mounted without clearance, the periphery of the piston ring pot 1 is obtained as a true copy of the copying cam 11 in a ratio modified according to the position of the roller 18 relative to the rocker arm 14.

What I claim as my invention and desire to secure by Letters Patent, is:

In a copying lathe for machining work pieces, such as non-round piston rings, a frame, guide means on said frame, a slide mounted for reciprocatory movement on said guide means, spring means between said frame and said slide urging the slide in one direction on said guide means, a spindle rotatably mounted in said slide with its axis perpendicular to the direction of movement of said slide, means secured to said spindle for carrying the work piece, a copying cam secured to said spindle, a rocker arm, means pivotally connecting said rocker arm to said slide with a pivot axis parallel to the axis of said spindle, a roller rotatably mounted in said rocker arm with its axis of rotation parallel to the axis of said spindle and in a position for engagement with the circumferential surface of said copying cam, an abutment roller in engagement with said rocker arm in a position to counteract said spring means, an abutment surface on said rocker arm for engagement with said abutment roller, the geometrical plane of said surface passing through the pivot axis of said rocker arm, a second slide, means connecting said second slide with said frame, means for adjusting the position of said second slide on said connecting means and means pivotally connecting said abutment roller to said second slide in engagement with said abutment surface and in a position to counteract said spring means, said abutment surface on the rocker arm being parallel to the direction of adjustment of said second slide on said frame in the central position of said rocker arm.

References Cited in the file of this patent

UNITED STATES PATENTS

| | | |
|---|---|---|
| 733,521 | Walcutt | July 14, 1903 |
| 1,190,390 | Fellows | July 11, 1916 |
| 1,259,770 | Olson | Mar. 19, 1918 |
| 1,739,268 | Stein | Dec. 10, 1929 |
| 1,893,916 | Waldrich | Jan. 10, 1933 |
| 2,557,043 | Wright | June 12, 1951 |
| 2,592,875 | Durland | Apr. 15, 1952 |